United States Patent Office 2,704,287
Patented Mar. 15, 1955

2,704,287

5-(2-CYCLOHEXYLETHYL)-2-THIOHYDANTOIN AND PROCESS

Sydney Archer, Albany, N. Y., assignor to Sterling Drug Inc., New York, N. Y., a corporation of Delaware No Drawing. Application April 22, 1954, Serial No. 425,053

3 Claims. (Cl. 260—309.5)

This invention relates to 5-(2-cyclohexylethyl)-2-thiohydantoin and to its preparation. This compound, in either the acid or the salt form, is useful as a pharmaceutical agent, in particular, for its antitubercular properties.

This compound can be prepared by heating 2-amino-4-cyclohexylbutanoic acid with a water-soluble inorganic thiocyanate and a lower alkanoic acid anhydride, preferably in the presence of a lower alkanoic acid, and thereafter deacylating the corresponding 1-acyl-5-(2-cyclohexylethyl)-2-thiohydantoin by heating it with a strong base or a strong mineral acid to remove the 1-acyl group. From the standpoint of convenience, accessibility and economy, acetic anhydride and acetic acid are preferred as the lower alkanoic acid anhydride and lower alkanoic acid, respectively; hydrochloric acid, as the strong mineral acid; sodium hydroxide, as the strong base; and ammonium thiocyanate, as the water-soluble inorganic thiocyanate. The compound of my invention can be prepared in the absence of a lower alkanoic acid, e. g., acetic acid, although less desirably.

My invention is further illustrated as follows without, however, limiting it thereto:

*2-amino-4-cyclohexylbutanoic acid*

Twelve grams (12.0 g.) of sodium was dissolved in 250 ml. of ethanol with stirring. To this solution was added 88.5 g. of ethyl acetamidocyanoacetate and 100 g. of 2-cyclohexylethyl bromide, and the resulting mixture was refluxed with stirring overnight. The cooled reaction mixture was poured into about one liter of ice water and the material that separated was triturated until solid. The solid material was collected, washed successively with water and n-pentane, and then refluxed overnight with about 750 ml. of concentrated hydrochloric acid. The hot solution was treated with decolorizing charcoal and the mixture filtered through a sintered glass funnel linked with a filter aid such as infusorial earth. On standing overnight, the filtrate yielded 2-amino-4-cyclohexylbutanoic acid as its hydrochloride salt. This salt was collected, dissolved in boiling water; and the solution was treated with ammonium hydroxide until alkaline and then with acetic acid until slightly acidic. On cooling, there separted the product which was collected and washed successively with water, ethanol and ether. The product, 2-amino-4-cyclohexylbutanoic acid, was recrystallized from aqueous acetic acid and dried at about 50° C.; wt., 58.8 g.

*5-(2-cyclohexylethyl)-2-thiohydantoin*

A mixture containing 58.8 g. of 2-amino-4-cyclohexylbutanoic acid, 42.2 g. of ammonium thiocyanate, 191 cc. of acetic anhydride and 21.3 g. of acetic acid was refluxed for about twenty minutes and then poured into about 1500 ml. of ice water to hydrolyze the unreacted acetic anhydride. The resulting 1-acetyl-5-(2-cyclohexylethyl)-2-thiohydantoin was removed from the aqueous solution by extracting the same with chloroform. Removal of the chloroform by distillation in vacuo yielded the 1-acetyl-5-(2-cyclohexylethyl)-2-thiohydantoin. This compound was combined with a mixture of about 130 ml. each of ethanol, water and concentrated hydrochloric acid; and the resulting solution was refluxed for about forty minutes. The solution was allowed to cool, followed by chilling in an ice bath, whereupon there separated the product which was collected, washed with water and recrystallized from ethanol to which decolorizing charcoal had been added. A second recrystallization from ethanol yielded 40.5 g. of 5-(2-cyclohexylethyl)-2-thiohydantoin, M. P. 177.1–178.0° C. (corr.).

Anal.—Calcd. for $C_{11}H_{18}N_2OS$: N, 12.38; S, 14.17. Found: N, 12.43; S, 14.25.

Instead of using ammonium thiocyanate in the above procedure, there can be used an equivalent amount of sodium thiocyanate, potassium thiocyanate, calcium thiocyanate, or another water-soluble thiocyanate salt.

The deacetylation can also be effected by heating the 1-acetyl-5-(2-cyclohexylethyl)-2-thiohydantoin with a slight excess of aqueous sodium hydroxide.

The 5-(2-cyclohexylethyl)-2-thiohydantoin of my invention can be used in either the free acid form or in the form of its salts with relatively non-toxic cations such as sodium, potassium, calcium, magnesium, ammonium, ethanolammonium, and the like. The usefulness of 5-(2-cyclohexylethyl)-2-thiohydantoin was established by experiments in Swiss mice, which were infected intravenously with large inocula of virulent human-type tubercle bacilli. The oral administration of my compound resulted in prolonged survival time, suppression of tuberculous lesions in the lungs, and in inhibiting the multiplication of tubercle bacilli. The compound was found to have an oral $ALD_{50}$ in mice of greater than 2000 mg. per kg.

I claim:
1. 5-(2-cyclohexylethyl)-2-thiohydantoin.
2. The process of preparing 5-(2-cyclohexylethyl)-2-thiohydantoin which comprises heating 2-amino-4-cyclohexylbutanoic acid with a water-soluble inorganic thiocyanate and a lower alkanoic acid anhydride and thereafter deacylating the resulting 1-acyl-5-(2-cyclohexylethyl)-2-thiohydantoin.
3. The process of preparing 5-(2-cyclohexylethyl)-2-thiohydantoin which comprises heating 2-amino-4-cyclohexylbutanoic acid with a water-soluble inorganic thiocyanate and acetic anhydride and thereafter deacetylating the resulting 1-acetyl-5-(2-cyclohexylethyl)-2-thiohydantoin.

No references cited.